J. C. ADAMS.
Preserving Meat.
No. { 2,224, 33,228. }
Patented Sept. 10, 1861.
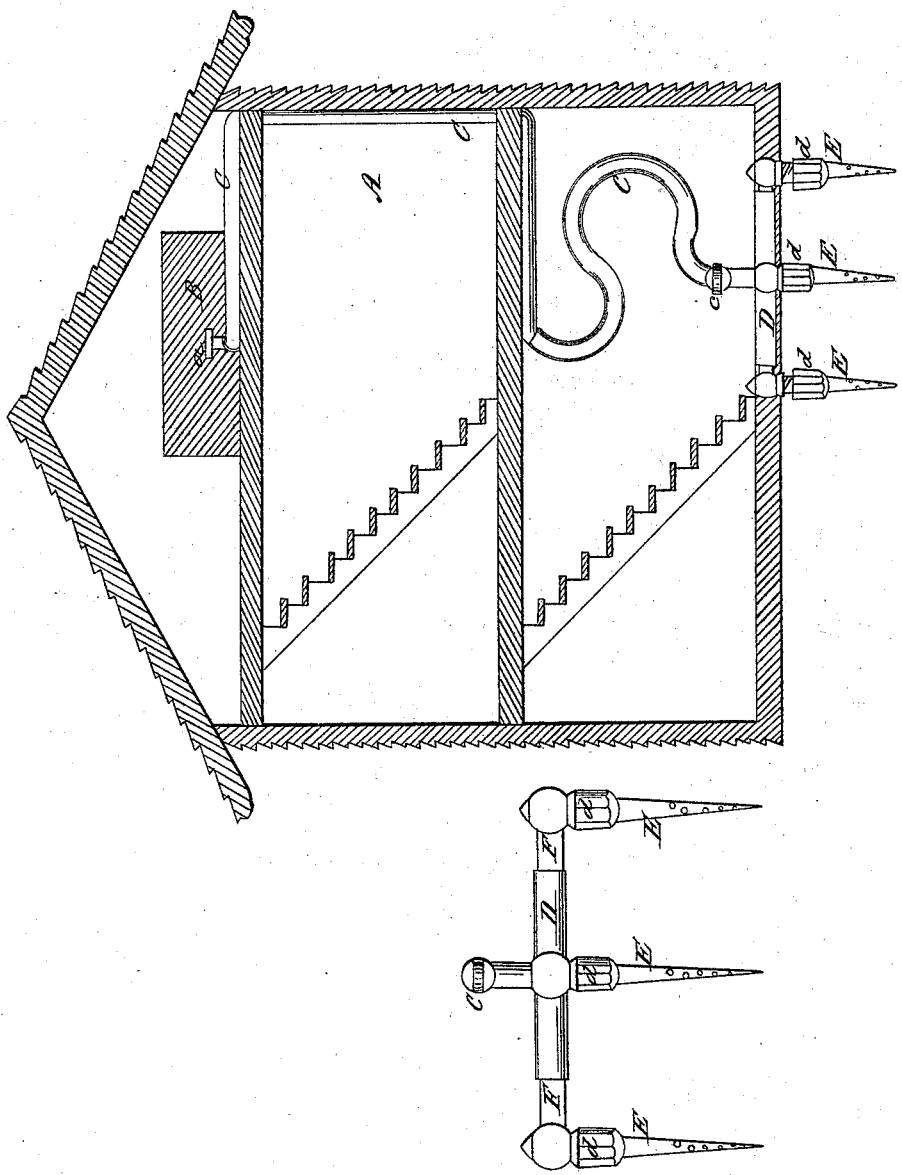
Witnesses:
C. M. Alexander
M. M. Dow
Inventor:
Jas. C. Adams

UNITED STATES PATENT OFFICE.

JAMES C. ADAMS, OF BALTIMORE, MARYLAND.

IMPROVEMENT IN APPARATUS FOR INJECTING MEAT WITH BRINE.

Specification forming part of Letters Patent No. 33,228, dated September 10, 1861.

*To all whom it may concern:*

Be it known that I, JAMES C. ADAMS, of Baltimore, in the State of Maryland, have invented certain new and useful Improvements in Meat-Curing Apparatus; and I do hereby declare that the following is a full, clear, and exact description of the same, reference being had to the accompanying drawing, and to the letters of reference marked thereon.

In the annexed drawing, making a part of this specification, A represents a building with three floors.

B is a reservoir, which is situated upon the third floor and which is filled with brine or any other preservative liquid. Leading from this reservoir to the lower floor is a pipe C, which is provided with two stop-cocks $a$ and $c$, one near its top and one near its lower extremity. To the lower end of the pipe C is secured an instrument for injecting the brine into the meat. This instrument consists of the sleeve D, the pipes F F, and the nozzles E E E, with the nuts $d\ d\ d$ upon the nozzles. The sleeve D connects with the pipe C, as shown, and the pipes F F slide into the sleeve at each of its ends. Two of the nozzles connect with the pipes F F at their outer ends, while the other nozzle connects with the sleeve near its center. $d\ d\ d$ are screw-nuts which pass over the nozzles near where they are secured to the pipes and sleeve. The nozzles are pointed and hollow, as shown, and near their pointed ends they are perforated with small holes, so as to allow the liquid to be used to escape in various directions.

In using this instrument it is usually secured in a horizontal position against the wall of the building, and the meat to be injected is forced against it, sliding and resting upon a table. The nuts $d\ d$ regulate the distance or depth to which the nozzles enter the meat, and also serve to close effectually the incision made by the nozzles to prevent the escape of the liquid. The two outer nozzles may be removed from the center one by drawing the pipes in the sleeve D, thus accommodating the instrument to different-sized pieces of meat, or may be used for injecting the meat rapidly at different points.

The position of the reservoir may be changed without affecting the principle of operation.

The object of this apparatus is to cure meats more rapidly than can be done by the ordinary process. It will be used principally in warm weather, when meats spoil before they can be saturated with brine in the usual way. Meat can be cured in this way in the course of two or three days, while the manipulation is more rapid and less laborious than in the ordinary process of salting.

When a piece of meat is thrust against the instrument, it is allowed to remain for a few moments, and it is completely and thoroughly saturated with brine by the uniform strong pressure from the tank or reservoir. When the meat is saturated, the cock $c$ may be turned by the operator and the flow of liquid cut off. It will readily be seen that by this operation meat may be cured very effectually and very speedily, for the brine is injected into the center of the meat and around the bone, where it is most difficult to get it by the old process of salting.

Having thus fully described my invention, what I claim as new, and desire to secure by Letters Patent, is—

Not broadly the use of hydrostatic pressure, but saturating pieces of meat with brine or other preservative liquid under uniform hydrostatic pressure by means of apparatus substantially as specified, for the purpose of rapidly salting or curing the same.

JAS. C. ADAMS.

Witnesses:
   C. M. ALEXANDER,
   M. M. DOW.